United States Patent [19]

Fraiser

[11] 4,385,427

[45] May 31, 1983

[54] MACHINE FOR INSTALLING UPHOLSTERY COVERS

[76] Inventor: Frederick F. Fraiser, 800 Windermere, Beulah, Mich. 49617

[21] Appl. No.: 214,456

[22] Filed: Dec. 8, 1980

[51] Int. Cl.³ .......................... B68G 7/00; B68G 15/00
[52] U.S. Cl. .......................................... 29/91.5; 29/91
[58] Field of Search ................ 29/91, 91.1, 91.2, 91.3, 29/91.4, 91.5, 91.6, 91.7, 91.8, 235, 450; 53/567, 576, 528; 297/DIG. 1

[56] References Cited

U.S. PATENT DOCUMENTS

| | | | |
|---|---|---|---|
| 1,546,689 | 7/1925 | Verwys | 29/91.5 |
| 1,801,029 | 4/1931 | Vandervoot | 29/91.7 |
| 3,438,108 | 4/1969 | Nash | 29/91.5 |
| 3,961,459 | 6/1976 | Wolske | 53/556 |

FOREIGN PATENT DOCUMENTS

| | | | |
|---|---|---|---|
| 1485526 | 7/1969 | Fed. Rep. of Germany | 29/91.1 |
| 2151966 | 11/1972 | Fed. Rep. of Germany | 29/91.5 |
| 2801948 | 7/1979 | Fed. Rep. of Germany | 29/91 |
| 797359 | 7/1958 | United Kingdom | 29/91.5 |
| 800243 | 8/1958 | United Kingdom | 29/91.5 |
| 1474202 | 5/1977 | United Kingdom | 53/557 |

Primary Examiner—Robert E. Garrett
Assistant Examiner—Jerry Kearns
Attorney, Agent, or Firm—Glenn B. Morse

[57] ABSTRACT

The padded frame of a seat being upholstered rests on a support placing the back of the seat in vertical alignment under a carriage mounted on guides establishing a vertical freedom of movement of the carriage. The carriage has a cluster of resilient cantilever arms extending downward, each of the arms having a follower at the lower end adapted to move along the contour of the seat back. The cover for the seat back is slipped inside-out over the cluster of arms, and relative movement of the carriage toward the seat installs the cover outside-out. Other resilient arms in the cluster are preferably mounted on the frame of the machine, with relative movement provided by moving the seat unit with respect to the frame.

4 Claims, 11 Drawing Figures

4,385,427

MACHINE FOR INSTALLING UPHOLSTERY COVERS

BACKGROUND OF THE INVENTION

The construction of seating units is fairly standard, normally involving a frame with padding material secured to it in one way or another, over which a pre-sewn cover is slipped and secured. The appearance and firmness of the seat unit require a very close fit of the cover over the padding, resulting in the necessity of very considerable effort in this operation. There is a two-fold adverse effect to this, producing both an unduly large expenditure of time in the installation, and also a tendency toward fatigue and injury to the hands of the operators. It should also be noted that the practice of producing the covers in the first instance results in the completion of the sewing operation with the cover in an inside-out condition. The usual upholstery practice obviously requires a reversing of this by a process similar to turning a sock inside-out. The time involved in this maneuver is obviously significant in any closely-controlled production operation. These problems are particularly acute in the manufacture of vehicle seating, in which the numbers involved in a production run are large enough to attach great significance to the solution of these problems.

SUMMARY OF THE INVENTION

A padded seat frame is supported with its back in alignment with the path of movement of a carriage provided with a cluster of resilient catilever arms. These arms extend from the carriage toward the top of the back of the seat unit. A pre-sewn cover for the back is placed like a bag over this cluster of resilient arms, inside-out, the open end of the bag representing the lower extremity of the back of the seat unit. Relative movement of the carriage toward the seat causes the seat back to enter centrally between, and be surrounded by, the cluster of resilient arms, resulting in the placement of the cover over the back outside-out. The seat is also moveably mounted, so that other arms may be secured to the machine frame, thus providing two phases of relative movement between the arms and the seat back to accommodate somewhat different conditions taking place during the installation of the cover.

DESCRIPTION OF THE DRAWINGS

FIG. 9 is on an enlarged scale over that of the previous views.

DESCRIPTION OF THE PREFERRED EMBODIMENT

Figure 5:
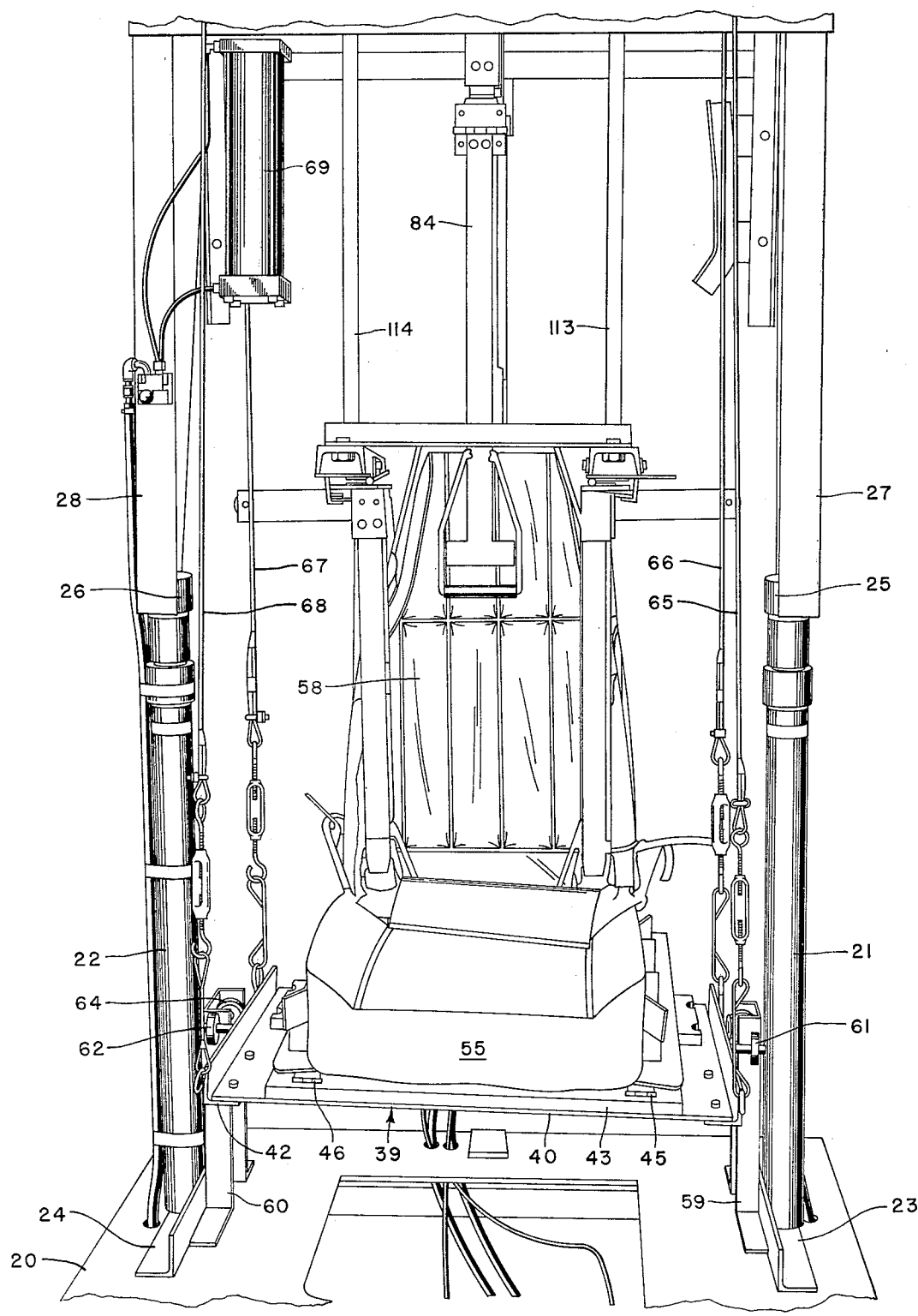
FIG. 5 shows the relative position of the machine and the seat, with the cover fully slipped over the back, and appearing in the outside-out condition.
Figure 6:
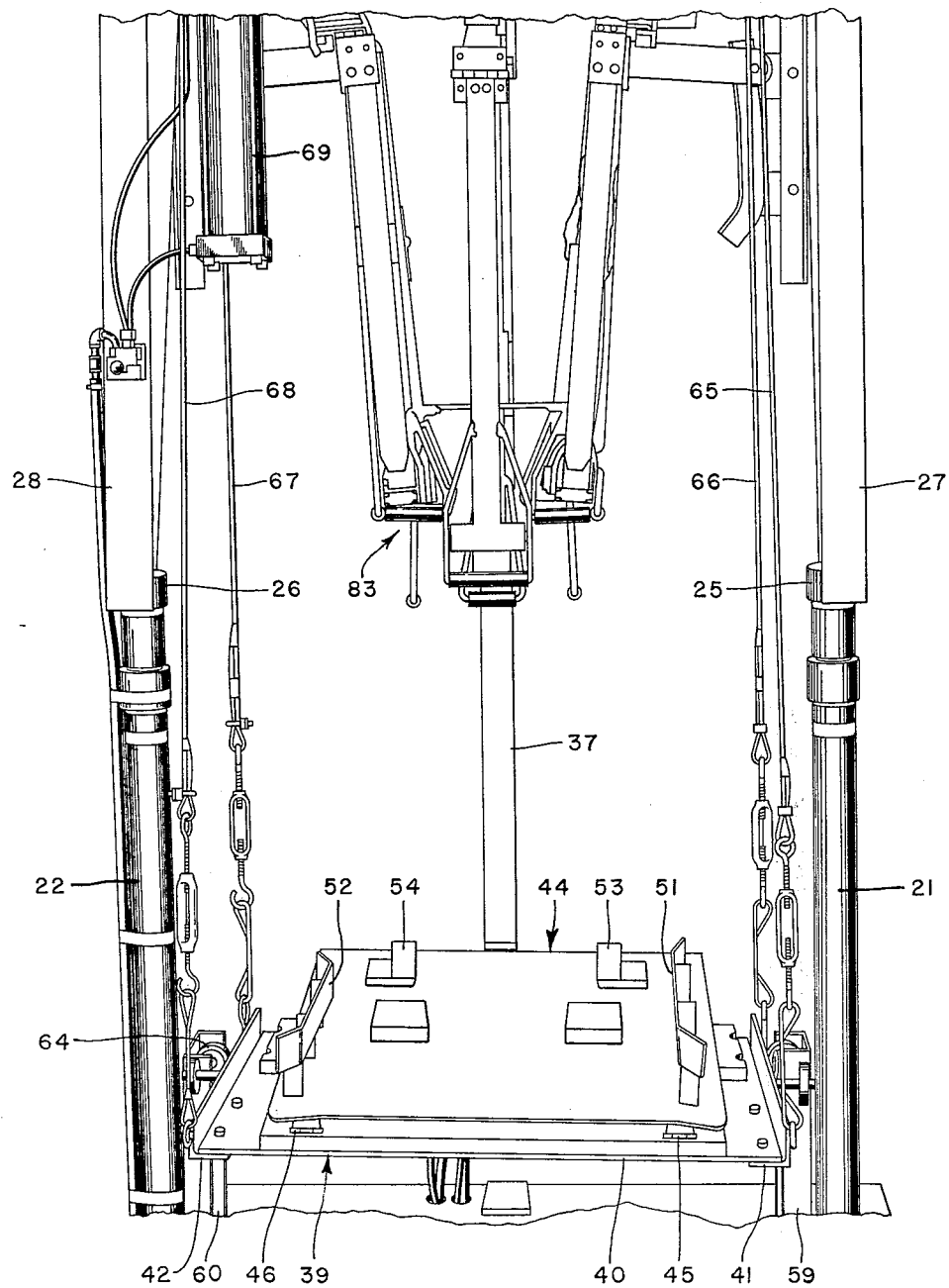
FIG. 6 shows the position of the machine components prior to the placement of the padded seat frame in position.
Figure 7:
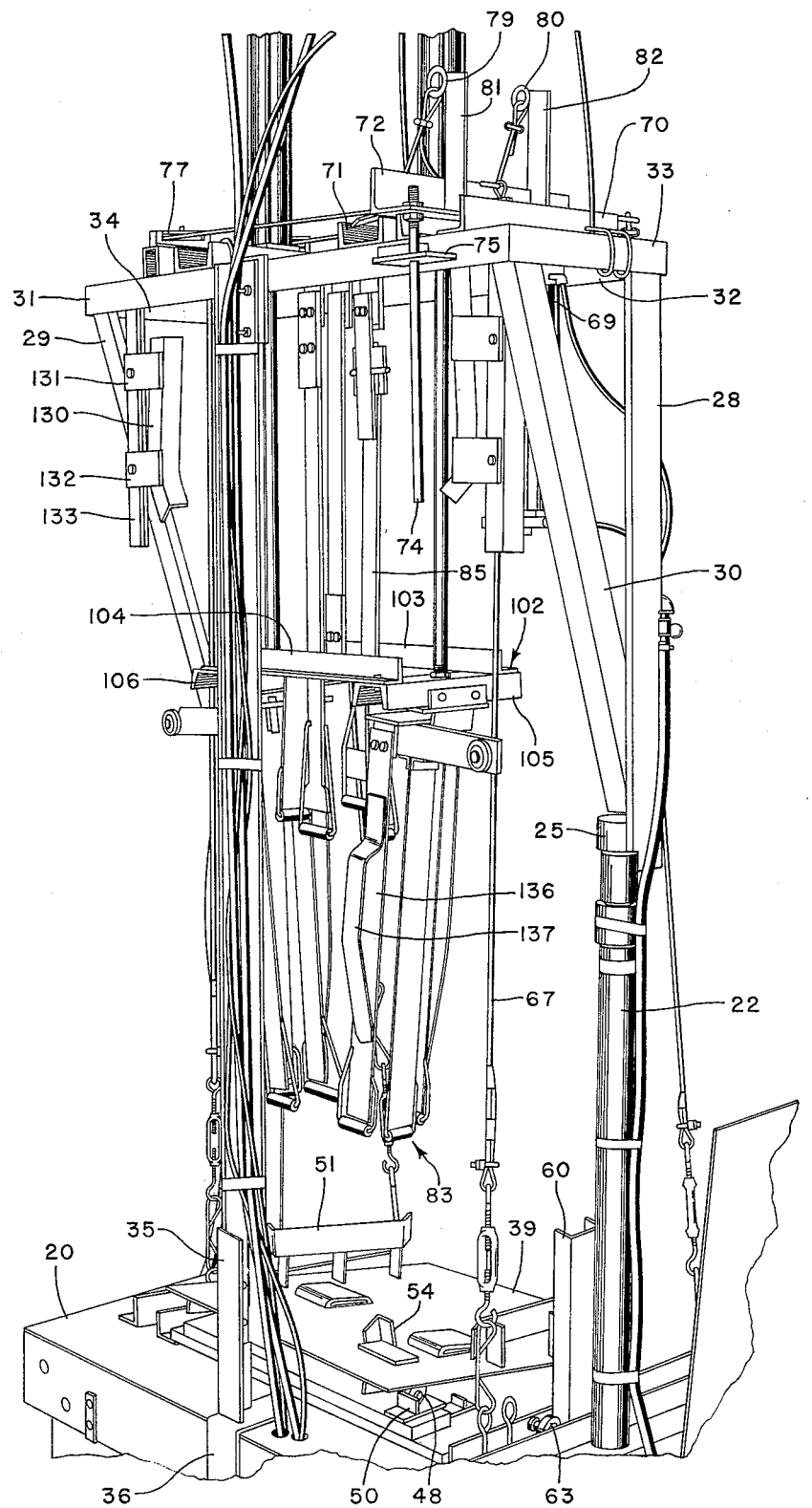
FIG. 7 is a perspective view from the rear quarter of the machine, with the components in position corresponding to a fully installed cover, but in the absence of a seat unit.
Figure 8:
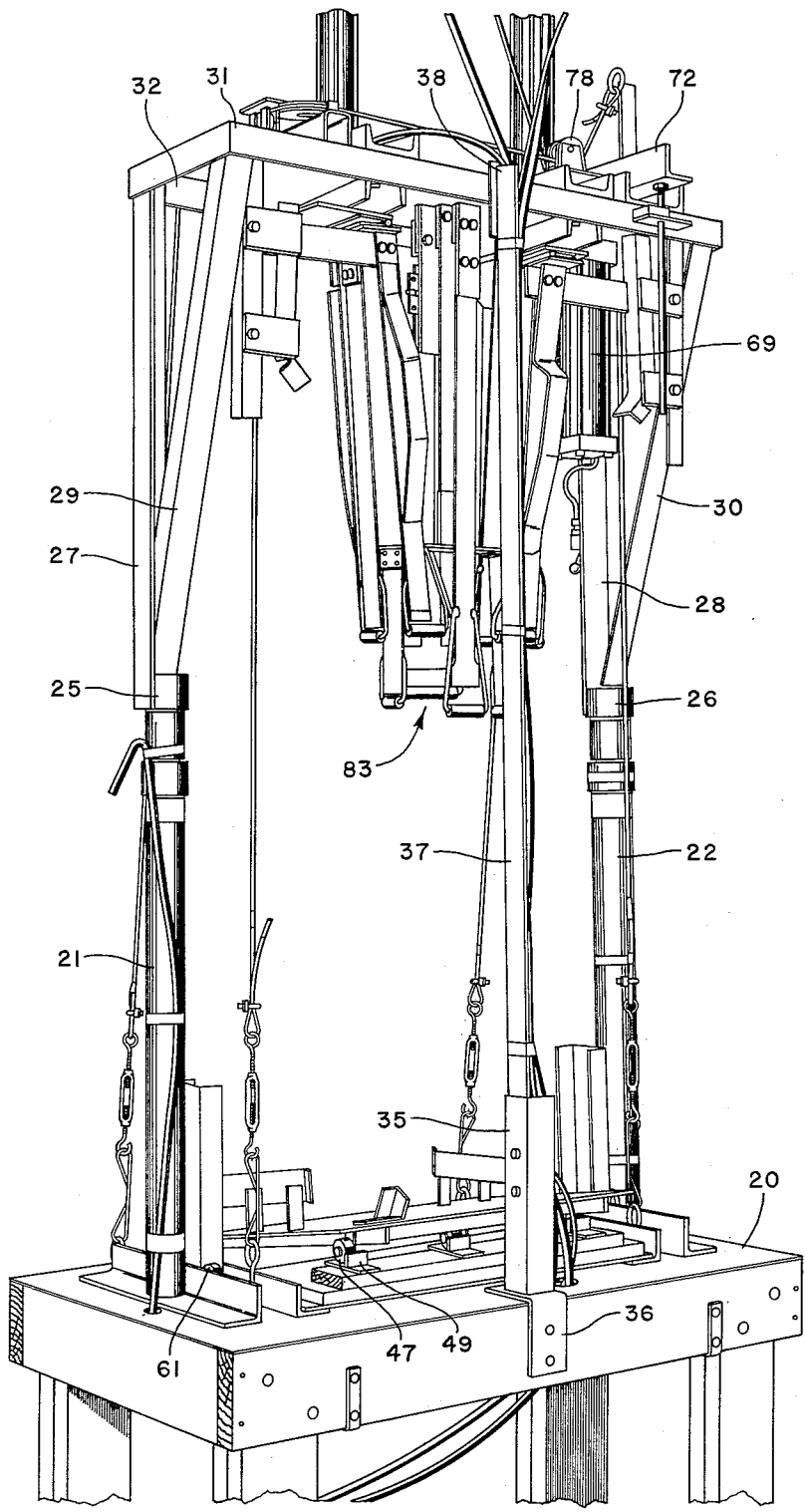
FIG. 8 is a perspective view from the opposite rear quarter from that appearing in FIG. 3, with the components of the machine in the initial position.

The frame of the machine includes the base 20 to which an upright structure is secured. This structure incorporates the tubular side members 21 and 22, which are preferably steel pipe. Each of these has a foot, as shown at 23 and 24 in FIG. 5, welded to the lower extremity of the sections of pipe, and secured to the base 20. The upper extremities of the pipe sections 21 and 22, at about mid-height of the frame, are in threaded engagement with the caps respectively indicated at 25 and 26, to which the upper portions of the frame are welded. On each side of the machine, a vertical 27 and 28 extends, respectively, from the caps 25 and 26. Diagonals 29 and 30 (Refer to FIGS. 7 and 8.) diverge from these verticals to suport the top rectangular structure, which includes the front and rear beams 31 and 32, and the side beams 33 and 34. The verticals, diagonals, and the top structure are preferably rolled steel members, of angular cross-section, and welded in position. At the rear of the machine, a bracket 35 (See FIG. 8.) is welded to the angular member 36 bolted to the base 20, and secures the lower end of the column 37, which is also angular in cross-section. The upper end of the column 37 is secured to a bracket 38 welded to the rear beam 32. This structure results in a tripod support for the upper structure, which supports most of the moving components of the machine.

Figure 1:
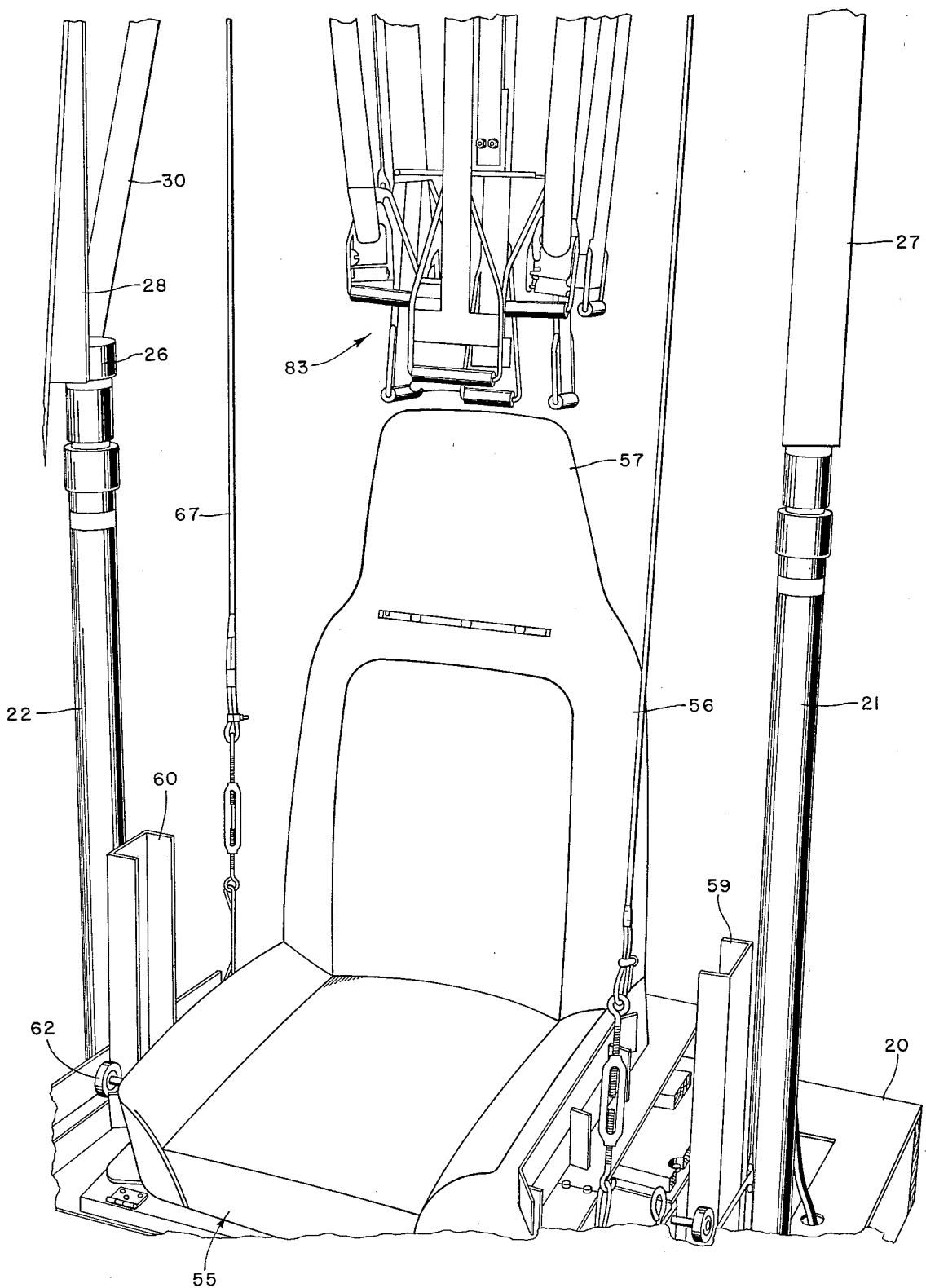
FIG. 1 is a perspective view showing a padded seat frame in position, preparatory to receiving the cover.

Referring to FIGS. 3-6, a platform 39 is formed by the steel plate 40 secured at its opposite sides to the angle rails 41 and 42. A wooden panel 43 is secured in any convenient manner to the plate 40, to which a seat receptacle generally indicated at 44 is normally secured to the panel 43 at the front of the machine by locks as shown at 45 and 46. The rear of the receptacle assembly is provided with rollers as shown at 47 and 48 (See FIG. 7.) secured to the plate 40, and which are capable of rolling across the surface of the panel 43 in a front-rear direction until limited by the stops 49 and 50, respectively. This arrangement gives a degree of front-rear adjustability of the position of the seat receptacle 44. The receptacle itself is provided with locating stops as indicated at 51-54 in FIG. 6 to determine the placement of a seat 55 with respect to the working components of the machine. The seat itself is of conventional construction, and will normally be received in the machine in the condition shown in FIG. 1. The seat unit is a padded frame including a back 56 terminating in an upper head rest portion 57, over which a cover 58 is to be installed.

Short vertical channels 59 and 60 are secured to the base 20 of the machine immediately inside the members 21 and 22 to form vertical guideways receiving rollers as shown at 61-63 (See FIGS. 3 and 7) secured to the side members 41 and 42 of the platform, and bearing against the front and rear flanges of the channels 59 and 60. Rollers 64 are also secured to the side members 41 and 42 of the platform, and bear against the inside surfaces of the channels 59 and 60 to locate the platform laterally with respect to the frame components of the machine. This arrangement permits vertical movement of the platform, carrying the seat, under the lifting action of the cables 65–68.

The lifting action of the cables is induced by the air-hydraulic cylinder 69. (Note FIG. 3.) This cylinder is mounted on the members 70–71 bridging across between the members 31 and 32 of the frame. A bar 72 (See FIG. 7.) is secured to the upper extremity of the piston rod 73 associated with the cylinder 69, and the rear of the bar 72 is stablized about the axis of the cylinder by the passage of the guide rod 74 (secured to the bar 72) through a suitable aperture in the plate 75 mounted on the frame. The cables 65 and 66 pass over pulleys as shown at 76–78 (and others not shown) to the connecting points 79 and 80 on the posts 81 and 82 secured to the bar 72. The cables 67 and 68 are connected directly to the bar 72, with the net result that upward extension of the piston rod 73 uniformly pulls the cables 65–68, and lifts the platform and seat.

Figure 9:
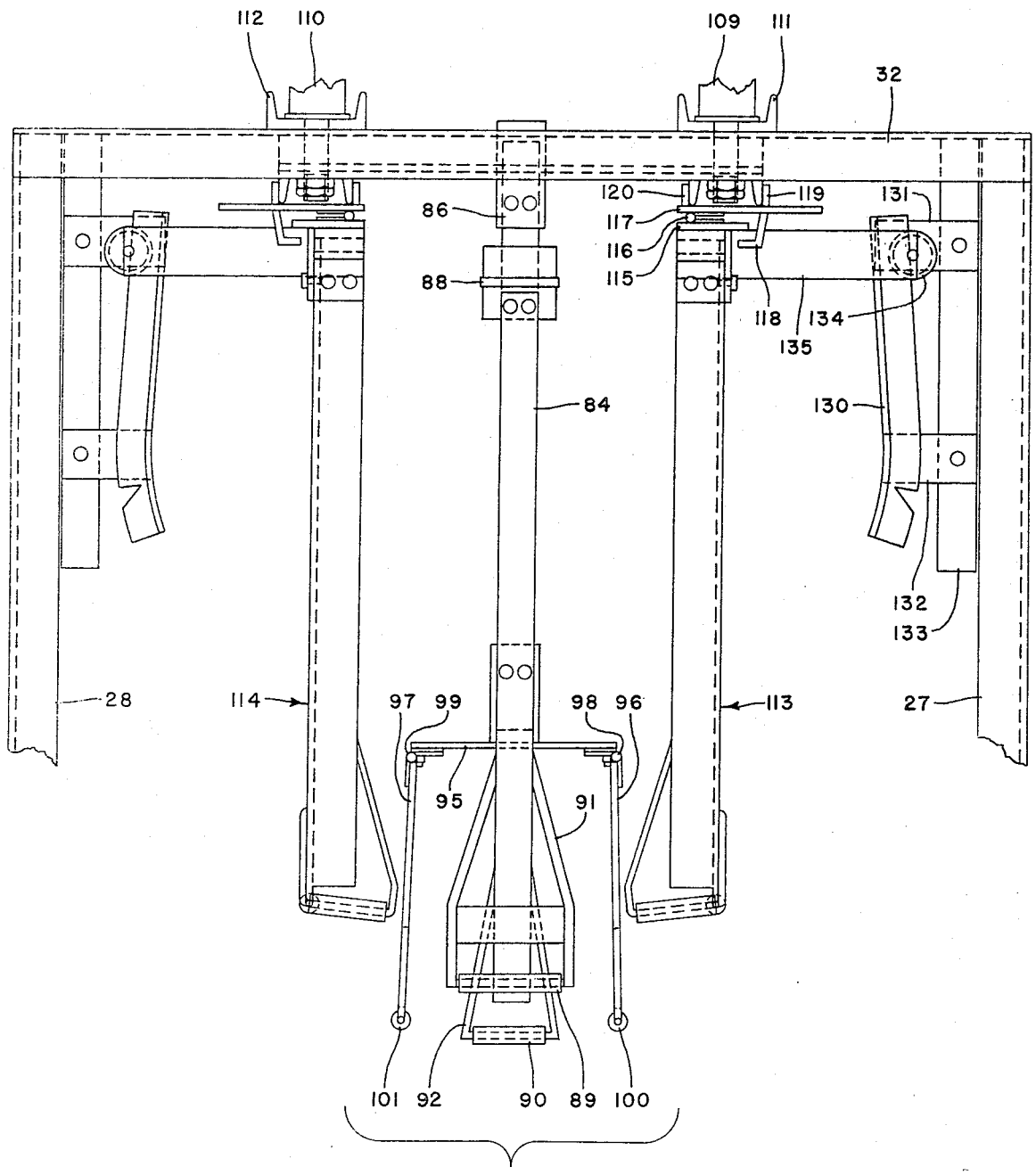
FIG. 9 is a front view showing the upper portion of the machine, with the components in the initial position.
Figure 10:
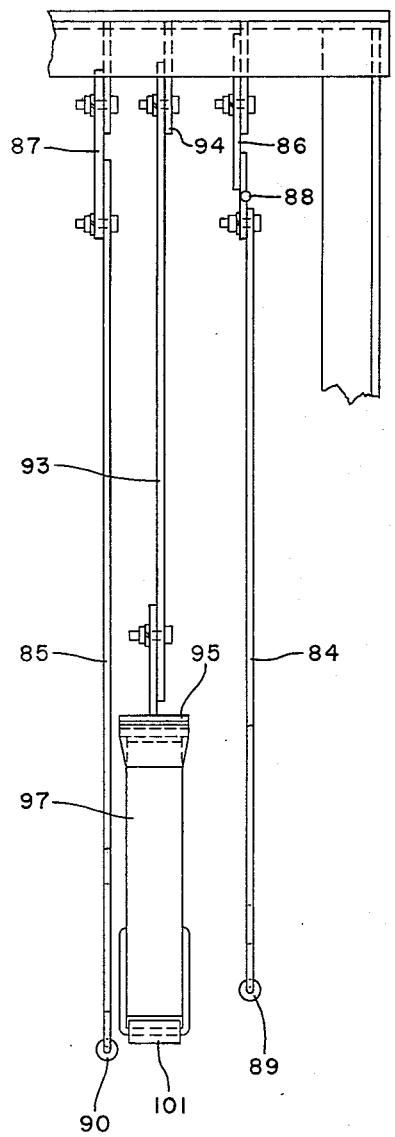
FIG. 10 is a side elevation of the inner arm assembly.
Figure 11:
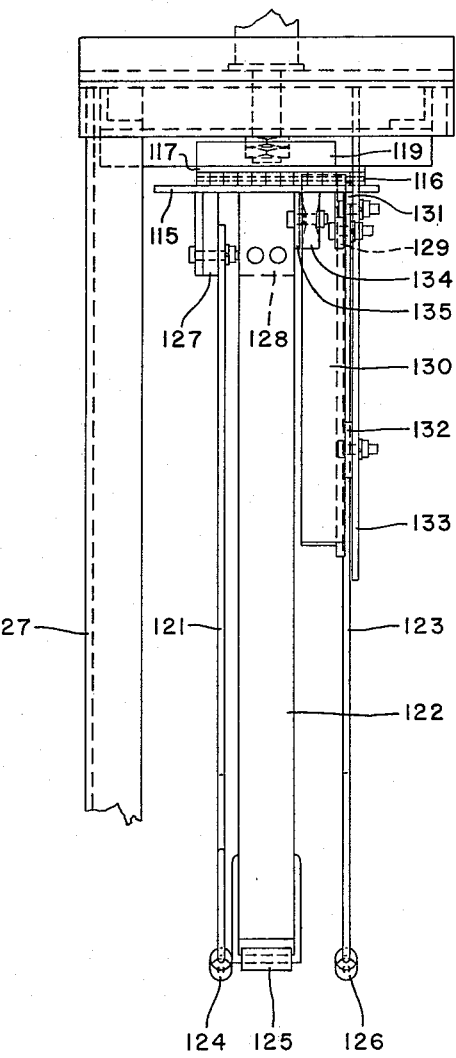
FIG. 11 is a side elevation of the outer arm assembly.

This relative movement of the seat with respect to the frame of the machine initiates the action of the cluster of resilient arms indicated at 83 shown in FIGS. 9–11. The front and rear central arms 84 and 85 are respectively mounted on the brackets 86 and 87 secured to the frame of the machine, with the arm 84 being hinged as shown at 88 to provide a somewhat greater freedom of movement than the natural resilience of the material would establish. The lower extremities of these arms are provided with rollers 89 and 90, respectively, supported by the forks 91 and 92. Relative movement of the seat and the cluster of arms 83 toward each other results in a movement of the rollers 89 and 90 downwardly over the head rest of the seat unit. An arm 93 is secured to the bracket 94 mounted on the frame of the machine to provide support for the transverse member 95 to which the short vertical arms 96 and 97 are hinged respectively at 98 and 99. Rollers 100 and 101 are respectively mounted at the lower extremities of these short arms, and these follow the sides of the head rest during the relative movement referred to above.

Figure 2:
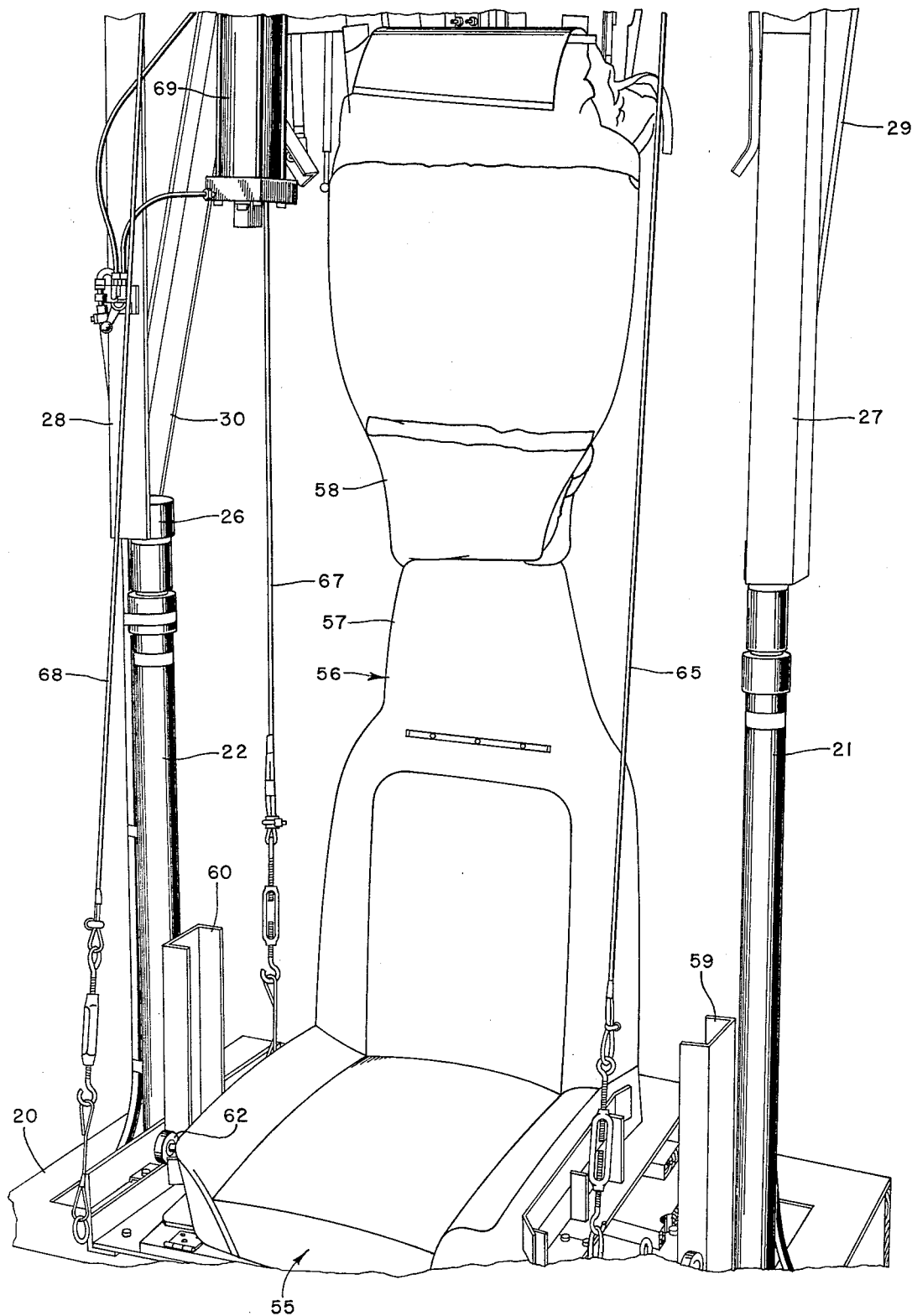
FIG. 2 is a view showing the machine with the cover slipped over the cluster of resilient arms, at the beginning of the relative movement which will result in the installation of the cover.
Figure 3:
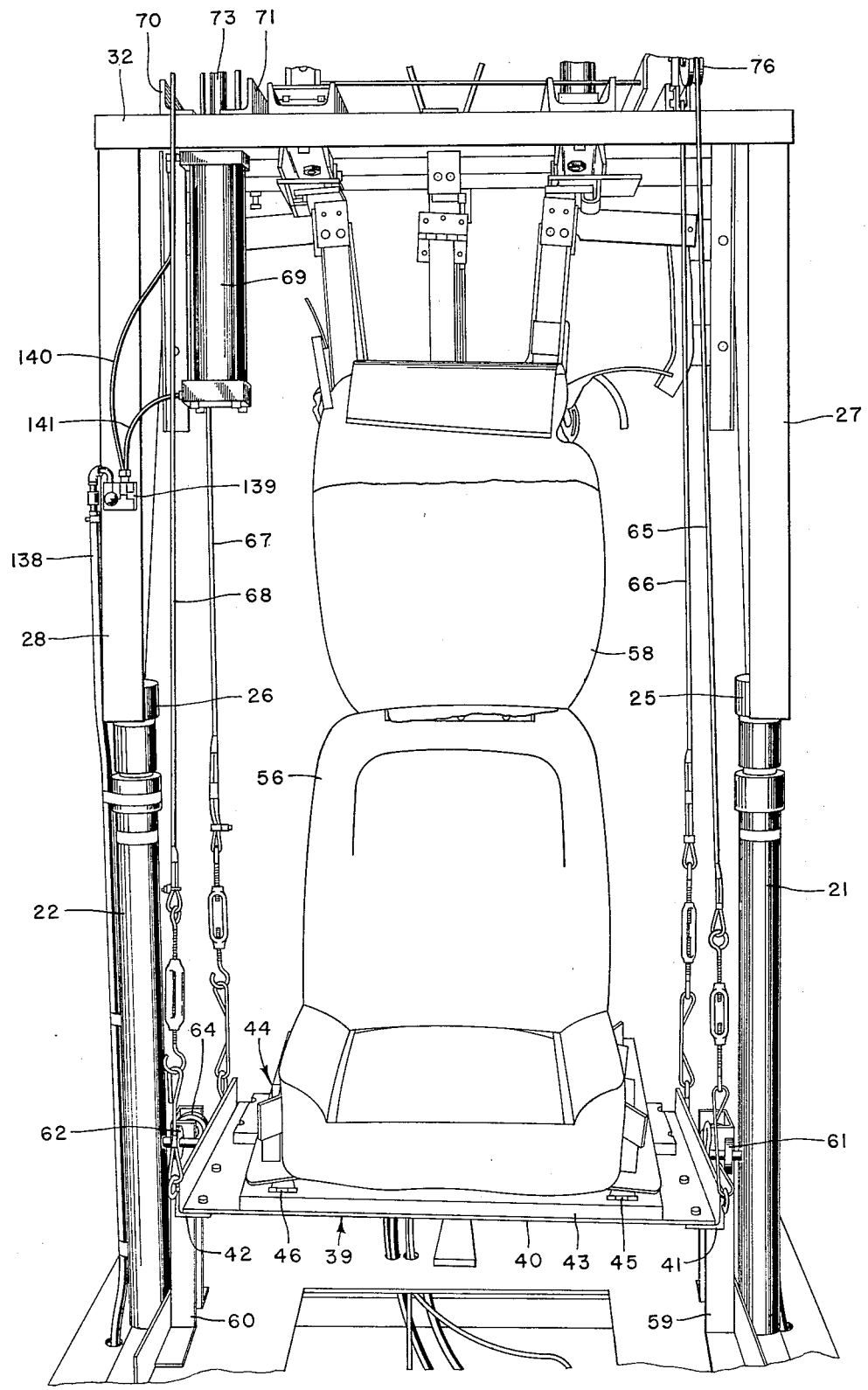
FIG. 3 shows the condition of the seat and the machine after the installation movement has progressed to the point that the cover has now been received over the upper portion of the seat back.
Figure 4:
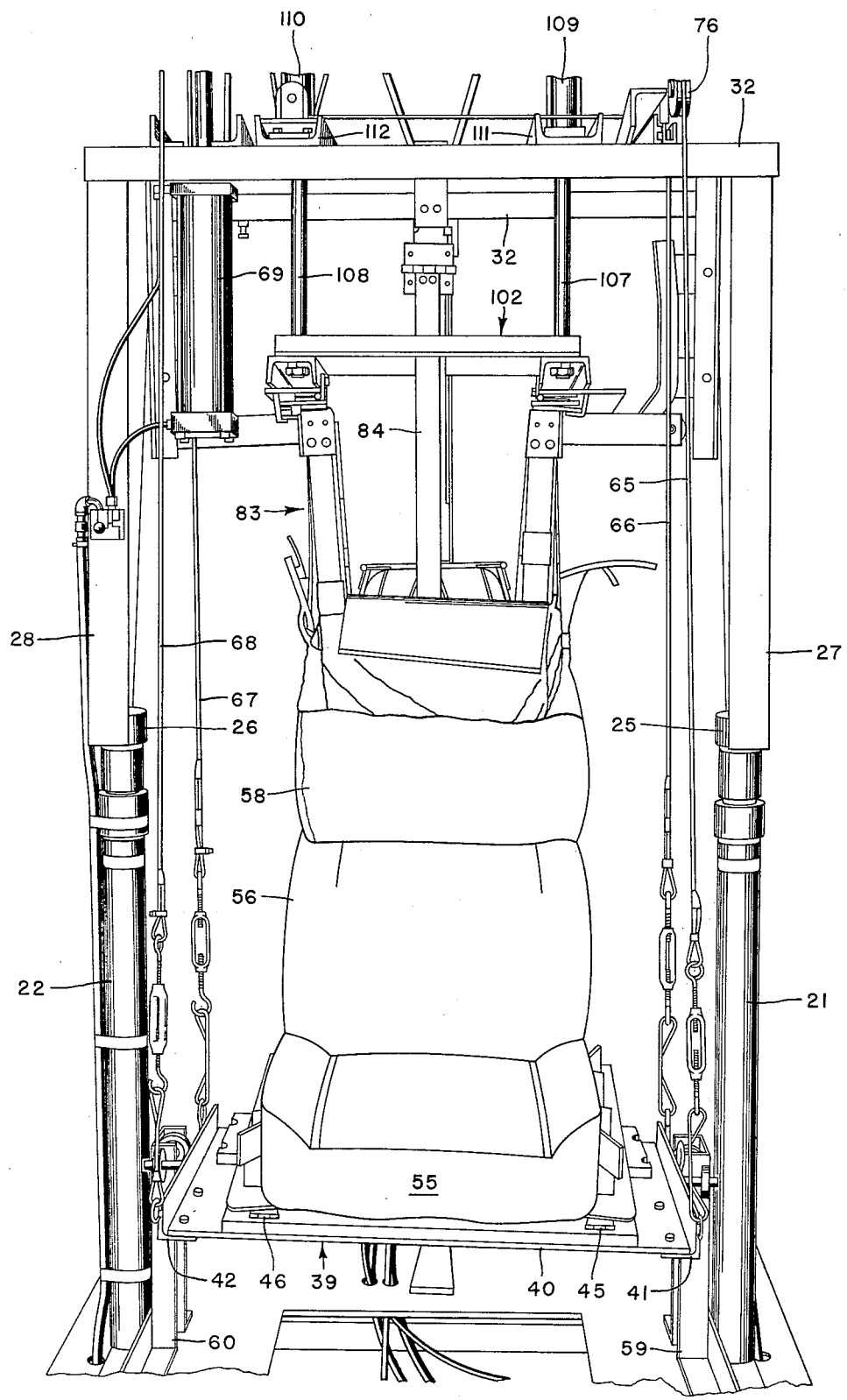
FIG. 4 is a view of a successive stage in the installation, with the cover now proceeding further down the back.

The operation of the machine involves the slipping of the bag-shaped cover 58 upwardly over the cluster of resilient arms 83, with the cover in the condition in which it was sewn (inside-out). Note FIG. 2. The relative movement of the seat with respect to the frame begins the installation of the cover by forcing the head rest of the seat into the cluster of arms, resulting in the embracement of the head rest by the arms 84, 85, 96, and 97, with the result that the head rest begins to push the cover right side-out as the rollers 89, 90, 100 and 101 follow the contour of the head rest. As soon as this relatively short vertical movement is accomplished, the work of the rollers 89, 90, 100, and 101 (and their associated structure) is accomplished. The remainder of the installation of the cover is accomplished by the action of the arm groups at the opposite sides of the working space within the frame. (Return to FIGS. 9–11). These outer arm groups are mounted on a carriage generally indicated at 102. This carriage is a simple rectangular structure including the front and rear members 103 and 104, and the side members (inverted channels) 105 and 106. The carriage is positioned by the piston rods 107 and 108 respectively associated with the cylinders 109 and 110 mounted on the bridging beams 111 and 112 secured to the frame members 31 and 32. Each of the side groups of resilient arms is of the same construction, except for being of opposite hand. These side groups are identified generally in FIG. 9 as 113 and 114. Only one of these will be described in detail. The members of each group are mounted on a plate 115 hinged at 116 to a plate 117 welded to the underside of the carriage channel 105. This arrangement gives a degree of lateral articulation of the arms to permit them to follow the contour of the seat back at the conjunction of the head rest with the broader portion of the back. A limitation on the freedom of the lower extremity of the side group of arms to swing towards the center of the machine is provided by the angular stop 118 welded to the plate 117 in position to intercept the movement of the right-hand end of the plate 115. It is preferable that the plate 117 be provided with the flanges 119 and 120, so that this sub-assembly can be screwed or bolted to the channel 105 of the carriage.

Each of the side groups of arms includes a front arm 121, a middle arm 122 for following the edge of the seat back, and a rear arm 123. These are all provided with rollers at the lower extremity, as shown at 124–126. The upper extremities of these arms are secured to brackets 127–129, respectively, which are welded to the plate 115. A cam rail 130 is mounted on the supports 131 and 132 secured to the vertical 133 welded to the frame of the machine. A follower roller 134 is positioned to bear against the front-end flange of the rail 130, and is rotatively mounted at the end of the crank arm 135 welded to the plate 115. During the downward movement of the carriage, the interengagement of the roller 134 with the rail 130 will urge the lower entremities of the side groups of arms to swing outward, and maintain the cover in preparation to slip downward over the back of the seat smoothly by generating some degree of lateral tension. This smooth movement of the cover during the transition from inside-out to outside-out may be further facilitated by the inclusion of resilient sponge material attached to the outsides of certain of the arms, as shown at 136 in FIG. 7. This material is contoured to properly occupy the space inside the cover during the downward movement, and these pieces of sponge material are preferably covered by a surface strip of metal 137 to minimize the sliding friction.

The control of the operations described above can be fully automatic, or the successive steps can be directly controlled by individual manually-operated devices. It is preferable that the upward movement of the platform precede the downward movement of the carriage, and this can be established by appropriate standard switch devices (not shown) operative to open and close the valves distributing the air pressure to the various cylinders. The arrival of the platform and its upper extremity of movement can be used as the control factor by providing a standard limit switch (not shown) engaged by the platform, or by a member associated with it. This event will then trigger the downward movement of the carriage. Alternatively, a universal control device can be programmed to energize the various operations in any desired sequence. Air pressure to the cylinders is distributed from the pressure line 138 at 139 to the lines 140 and 141. These circuits are conventional, and no attempt is made to include the extensions of these lines, which are frequently obscured by the structure of the machine.

I claim:

1. In combination with a seating unit having a surface to be covered, a machine for installing an upholstery cover, said machine comprising:
   a frame;
   a supporting structure, means for moveably mounting said supporting structure on said frame, said supporting structure having a receptacle adapted to receive said unit preparatory to receiving a cover over at least a part thereof;
   a carriage, means for moveably mounting said carriage mounted on said frame for movement parallel to the movement of said supporting structure;
   at least one cantilever arm mounted on said carriage, said arm having a longitudinal axis disposed parallel to said movement, said arm being resilient and providing biasing toward said unit surface said movement causing the outer extremity of said arm to follow closely over the surface of said upholstery unit part; and
   operating means for inducing said movement.

2. A machine as defined in claim 1, wherein the outer extremity of said arm is provided with at least one roller disposed on an axis parallel to said surface and transverse to the longitudinal axis of said arm.

3. A machine as defined in claim 1, further including at least one second cantilever arm secured at the mounted end thereof in a linearly fixed position on said frame.

4. A machine as defined in claim 1, in combination with a cover having a particular configuration, and including a group of said arms disposed in a substantially parallel cluster, said cluster being at least partially receivable within said cover, said cover being in an inside-out condition.

* * * * *